United States Patent
Schmidt et al.

(10) Patent No.: US 10,019,444 B2
(45) Date of Patent: Jul. 10, 2018

(54) UNIVERSAL IDENTIFIER

(71) Applicant: APPLE INC., Cupertino, CA (US)

(72) Inventors: Edward T. Schmidt, Burlingame, CA (US); Nicholas J. Paulson, San Francisco, CA (US); Nathan de Vries, San Francisco, CA (US); Marc E. Weinberger, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 620 days.

(21) Appl. No.: 14/536,194

(22) Filed: Nov. 7, 2014

(65) Prior Publication Data

US 2015/0347511 A1   Dec. 3, 2015

Related U.S. Application Data

(60) Provisional application No. 62/005,699, filed on May 30, 2014.

(51) Int. Cl.
*G06F 17/30* (2006.01)

(52) U.S. Cl.
CPC .............. *G06F 17/30038* (2013.01)

(58) Field of Classification Search
CPC .................................................. G06F 17/30038
See application file for complete search history.

(56) References Cited

U.S. PATENT DOCUMENTS

| | | | | |
|---|---|---|---|---|
| 2004/0003398 A1* | 1/2004 | Donian | ................... | G06F 21/10 725/34 |
| 2008/0081558 A1* | 4/2008 | Dunko | ................. | G11B 27/002 455/41.1 |
| 2008/0155079 A1* | 6/2008 | Spiegelman | ....... | H04N 21/4825 709/223 |
| 2013/0238742 A1* | 9/2013 | Kay | ...................... | G06F 9/5016 709/213 |
| 2014/0258464 A1* | 9/2014 | McCoy | ............... | H04L 65/4084 709/219 |

* cited by examiner

*Primary Examiner* — Jennifer N To
*Assistant Examiner* — Ashely M Fortino
(74) *Attorney, Agent, or Firm* — Kilpatrick Townsend & Stockton LLP

(57) ABSTRACT

A user listening to a content item on a preceding device and wishes to continue with the listening experience on a subsequent device initiates a continuity request from the subsequent device to the preceding device. The preceding device responds to the received continuity request by determining a multiverse identification that is contained in the continuity request, such that the multiverse identification uniquely identifies the content item that is currently playing on the preceding device over all known playback devices with which it has communicated. The subsequent device determines if the content item exists in a local database of the subsequent device and, if it exists, the subsequent device plays the content item from the local database of the subsequent device, and otherwise obtains the content item.

23 Claims, 6 Drawing Sheets

```
+------------------------------------------------------------------------------
+ Multiverse  + No. of   + Purchase ID   + Asset    + iPhone  +
+ header      + fields   +               + (ADAM)   + local   +
+             + ("x")    +               + ID       + ID      +
+------------------------------------------------------------------------------
```

FIG. 4A

```
+------------------------------------------------------------------------------------
+ Multiverse  + No. of    + Purchase ID   + Asset     + iPhone   + Device 2  +
+ header      + fields    +               + (ADAM)    + local    + local     +
+             + ("x+1")   +               + ID        + ID       + ID        +
+------------------------------------------------------------------------------------
```

FIG. 4B

UNIVERSAL IDENTIFIER

CROSS-REFERENCES TO RELATED APPLICATIONS

The present application claims the benefit of U.S. Provisional Application No. 62/005,699 filed May 30, 2014 entitled "Universal Identifier," by Schmidt, et al. which is hereby incorporated by reference for all purposes.

BACKGROUND

The present disclosure relates generally to wireless electronic devices and in particular to transferring a listening session from one device to another device.

Many wireless electronic devices such as mobile platforms, wireless telephones, portable music players, and the like are capable of performing activities, such as playing recorded media content. The media content may comprise items such as songs, movies, video clips, and the like. With the proliferation of such wireless electronic devices, many users carry such devices wherever they go, and may listen to playback of media content items on multiple devices. Increased convenience and enjoyment by a user may be gained from continuing the activity, such as playback of a media content item, beginning on one device and moving the activity to another device, without disrupting the user experience during and after the move, even though the content item may be missing from the subsequent device. Currently, there is no convenient means of achieving such operation.

BRIEF SUMMARY

In accordance with embodiments of the present invention, a user who is engaged in an activity on a preceding device and wishes to continue with the activity on a subsequent device can initiate a continuity request from the subsequent device to the preceding device. The preceding device can respond to the received continuity request by determining a universal identifier that is contained in the continuity request. In the case of an application having a playback activity, the universal identifier identifies the content item that is currently playing on the preceding device and comprises (a) a device-independent identifier that identifies the content item, (b) a local identifier of the content item that is uniquely assigned to the content item and identifies a location of the content item in a content item library database of the preceding device, and (c) metadata relating to the content item assigned by the preceding device such that the metadata specifies an application process location within the content item. The universal identifier uniquely identifies the content item that is currently playing on the preceding device over all known playback devices with which it has communicated. The application process location may comprise, in the case of a playback application, a location in the content item at which playback is taking place. The subsequent device determines if the content item exists in a local content item library database of the subsequent device and, if it exists, the subsequent device plays the content item from the local content item library database of the subsequent device, and otherwise obtains the content item.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 4A and FIG. 4B depict data fields of an example universal identifier 400.

DETAILED DESCRIPTION

Figure 1:
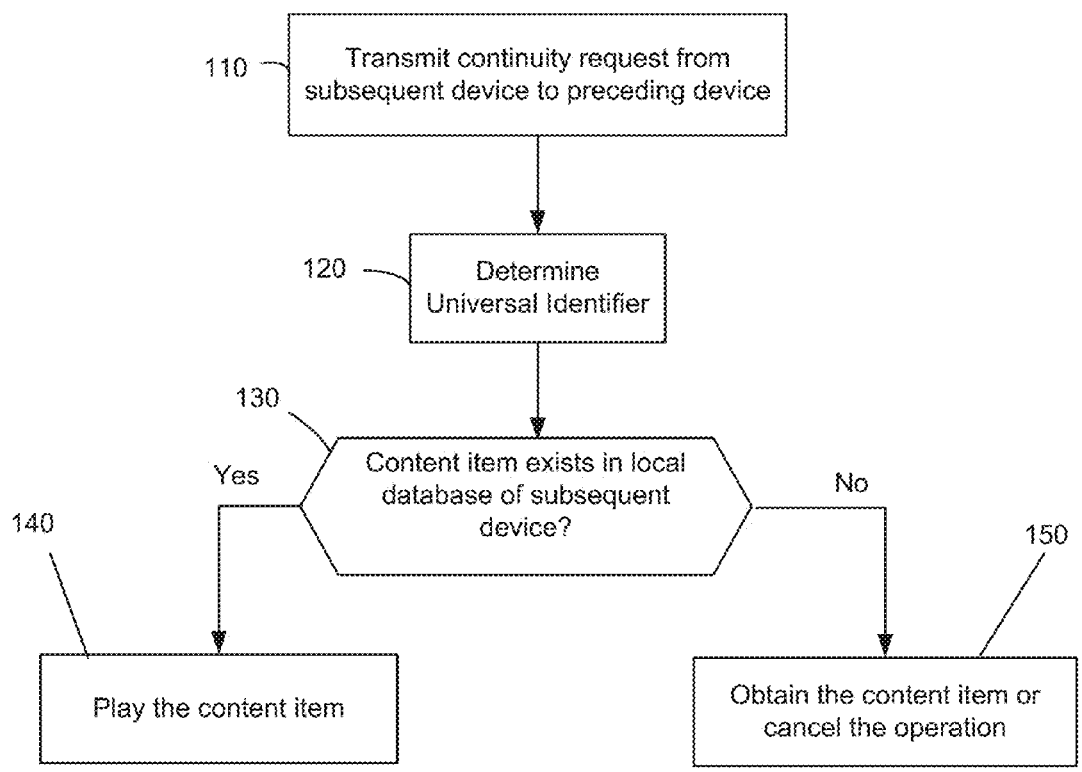
FIG. 1 is a flowchart of a method for continuing playback from a preceding device to a subsequent device, according to embodiments of the present invention.

Most wireless electronic devices that can play back recorded media content items, such as recorded music, movies, vocal recordings, and the like, utilize a content item library database that includes media content items and metadata relating to the content items. The library database is typically stored locally in memory of the device. For example, devices such as the "iPhone" by Apple, Inc. utilize a library database stored in an "iTunes" application. References herein to "iTunes" will be understood to refer to playback applications and corresponding device library databases generally. The description herein can also apply to other applications that implement activities and are associated with an application process location on other types of content items, such as images and documents.

Many users carry wireless electronic devices wherever they go, or may have multiple such devices dispersed around their household, and may listen to playback of media content items on multiple devices. Increased convenience and enjoyment by a user may be gained from playback of a media content item beginning on one device and moving the listening session to another device, without disrupting the playback experience during and after the move, even though the content item may be missing from the subsequent device. Described herein are techniques to provide users with a means to achieve such continuity of playback from device to device, without disruption to the listening experience.

In accordance with embodiments, media content items are identified with a universal identifier that can uniquely identify the media content item across different devices. The universal identifier uniquely identifies the content item that is currently playing on the preceding device over all known playback devices with which it has communicated. A user can request that playback of a media content item started on one device should be continued on a second device, with substantially no disruption in playback as the play moves from one device to the other. For example, a user might begin playback of a song or video on the user's "iPhone" device (i.e., the preceding device) and, upon arrival at the user's home, may want to continue with the playback of the song or video on the user's "AppleTV" device (i.e., the subsequent device). Thus, a user who is listening to a content item on a preceding device and wishes to continue with the listening experience on a subsequent device can initiate a continuity request between the subsequent device and the preceding device. Any two devices capable of wireless communication with each other may comprise the preceding device and subsequent device.

I. Continuity Request

To initiate continuity of playback with transfer of the listening experience from a preceding device to a subsequent device, a user causes a continuity request to be issued from the subsequent device back to the preceding device. Thus, the continuity request can be used to enable a user to seamlessly transfer content from one device to another. The continuity request may be initiated by activating a button or switch on the subsequent device to indicate the user's intent to migrate playback from the preceding device to the subsequent device. The button or switch may comprise a physical button, such as on a keypad, or may comprise a virtual button, such as a button icon on a touchscreen display panel.

FIG. 1 is a flowchart of a method 100 for seamless transfer of an activity from one device to another, such as continuing playback of a content item from a preceding device to a subsequent device, according to embodiments of the present invention.

At block 110, a continuity request is transmitted from the subsequent device to the preceding device. The transmission of the request can be initiated in response to a user input. For example, the user input may comprise activation of a "continuity request" button on a touch screen of the subsequent device or selection of a display button of the subsequent device user interface. That is, the user can select a continuity request button on the "home" display of the subsequent device, and in response a continuity request message can be sent from the subsequent device (the device on which the user wishes to continue with an activity such as playback) to the preceding device (the device on which the activity, such as playback of a media content item, is currently proceeding). As described further below, the operating system of the subsequent device can determine the device at which the user was previously engaged in the activity.

A. Universal Identifier

At block 120, the preceding device receives the continuity request message and can determine a universal identifier of the data content item of the currently active application on the preceding device. In the case of a content item being played by a music application of the preceding device, the universal identifier includes sufficient information to identify the content item being played. The universal identifier may also be referred to herein as the "multiverse identification". More particularly, the universal identifier includes multiple fields of data that provide a description of the content item and action to be continued from one device to another. For example, the fields of data in the universal identifier may specify the number of device identification numbers that follow in the universal identifier, indicate version number to specify features and functionality, provide a type identifier that indicates the item type of which is identified (e.g., a "playlist" type identifier indicates that the universal identifier is identifying a playlist, a "song" type identifier indicates that the universal identifier is identifying a song, and so forth for items such as an album, works of a particular artist, items in a genre, and the like). The universal identifier may also include a data field that indicates library sets of which the content item is a member. For example, a "song" type identifier may indicate that the item associated with the universal identifier is a song, but library set data may indicate that the song is a member of particular playlists, and may indicate that the song is found on a particular album, is performed by an artist, is a particular music genre, and the like. The universal identifier may also include a data field that specifies the current playback location of the content item. Additional data fields may be provided, in accordance with desired performance options and device capabilities.

B. Identifying the Content Item

After the continuity request message is received and the universal identifier is determined, the subsequent device then determines if the content item specified in the universal identifier exists in its local content item library database, as indicated by the FIG. 1 decision block 130. Such a determination can be performed relatively quickly and efficiently by the subsequent device because of the configuration of the universal identifier. More particularly, as a user initiates continuity requests in the course of engaging in device activities, such as listening to songs on the music application, each subsequent device will check the universal identifier for an entry that indicates the content item is locally stored, and if the item has heretofore not been the object of local processing, the subsequent device will add the content item to its library database and will add data providing a local identifier for the content item to the universal identifier. The local identifier can comprise a data field that identifies the particular local device, and a data field that identifies the content item location in the content item library database of the local device. The two data fields together comprise a local identifier of the content item. Such added data comprises additional data fields that are appended to the universal identifier, as described further below.

For example, if a user is listening to a song on the user's "iPhone" smartphone device and initiates a continuity request for the user's "iPad" tablet computer device, the local identifier for the song in the library database of the "iPhone" device is added to the universal identifier by the "iPhone" device, whereupon the universal identifier is sent to the "iPad" device. If the user later wishes to continue listening to the song on an "iPod" device, by initiating a continuity request from the "iPod" device back to the "iPad" device, then the universal identifier received by the "iPod" device will include the "iPad" identifier for the song, as well as the "iPhone" identifier for the song.

More particularly, a universal identifier is generated by a device when needed, based on whatever information is possessed by the device. For example, when a continuity request is being made to continue playback from a device B to a device A, the device B would generate a universal identifier that would include, for example, the asset management identifier, a purchase transaction identifier, and a local identifier for the device B. The device A would receive the universal identifier from the device B, and could then locate the item in its local library database by matching the asset management identifier and purchase transaction identifier, in the situation where the device A had not previously synced its library database with the device B. In the situation where the device B has previously synced its library database with the device A, the device B would also have the local device identifier for the device A. Therefore, in that situation, the universal identifier would contain, for example, the asset management identifier, purchase transaction identifier, local identifier for the device A, and local identifier for the device B. In this latter scenario, if the device A received a continuity request from the device B with this latter version of the universal identifier, then locating the item that is the object of the continuity request by the device A would be a simple lookup using its own local identifier.

A universal identifier is generated by a device when needed, based on whatever information is possessed by the device, in a cumulative fashion. For example, when a continuity request is being made to continue playback from a device B (preceding device) to a device A (subsequent device), the device B would generate a universal identifier that would include, for example, the asset management identifier, a purchase transaction identifier, and a local content item identifier for the device B. The device A would receive the universal identifier from the device B, and could then locate the content item in its local library database by matching the asset management identifier and purchase transaction identifier, in the situation where the device A had not previously synced its library database with the device B. In the situation where the device B has previously synced its library database with the device A, the device B would also have knowledge of the local device identifier for the device A. Therefore, in that situation, the universal identifier would contain, for example, the asset management identifier, a purchase transaction identifier, a local identifier for the device A, and a local identifier for the device B. In this latter scenario, if the device A received a continuity request from the device B with this latter version of the universal identifier, then locating the item that is the object of the continuity request by the device A would be a simple lookup for the device A using its own local identifier for the content item.

The universal identifier can include data fields in addition to those described thus far. For example, the universal identifier can include the following data fields:

Object Type—the type of object the identifier represents, e.g. a media item (song, movie, etc), album, artist, composer, genre, tv series or playlist.

Account ID—the user's store account ID (e.g., iTunes Match or Purchase).

Purchase ID—the identifier of the item on the iTunes purchase server (unique to the account).

Match Id—the ID of the item on the iTunes Match server (unique to the account).

ADAM ID—The unique asset management identifier of the item assigned by Apple when an item is added to the iTunes store.

Local Library ID's—a set of local library UUID+ID tuples, e.g. (library A/id=1000, library B/id=2000, etc).

Media Type—whether its a song, movie, podcast, etc.

Name—the alphanumeric string name of the item, used to match when no suitable identifiers are present.

Additional data fields may be included in the universal identifier. For example, such additional data fields may include: Duration—the playback duration of the item; Album Name—the title of the album, if the identifier is for a song; Artist Name—the name of the artist, if the identifier is for a song.

Because the universal identifier includes such multiple item-identifying data fields as described above, the operation of the FIG. 1 decision block 130 can be efficiently performed by the subsequent device to determine if the item that is the object of the continuity request is already stored in the corresponding library at the subsequent device. That is, if the content item was ever previously the object of a continuity request at the subsequent device, then the subsequent device will find the library identifier of the subsequent device as one of the data fields in the subsequent device by recognizing its own local device identifier and content item library database location among the data fields in the universal identifier. In this way, the subsequent device can quickly ascertain if the content item is already locally stored. It should be noted that, even if the content item is locally stored, its local device library identifier will not be included in the received universal identifier if the content item was not the object of a previous continuity request received at the subsequent device. In such a scenario, the subsequent device can still rather quickly determine if the content item is locally stored, by examining device-independent data fields of the universal identifier. For example, a content item purchased from an online source may be associated with data such as a purchase identifier, or a digital asset management identifier, or the like. These other data fields are typically inserted into the universal identifier upon an initial instance of a continuity request, but alternatively may be added to the universal identifier in the normal course of device operation, such as when added to a library database as by a synchronization operation.

Adding data fields to the universal identifier during the normal course of device operation can occur without any action on the part of the user. For example, a purchase identifier is assigned to a downloaded song when that song is purchased from an online song source, such as the "iTunes" store service of Apple Inc. The purchase identifier is unique to the song purchase transaction and is device-independent. Therefore, if the subsequent device does not find its local identifier in any data field of the universal identifier, it may still find the purchase identifier in a data field of the universal identifier, and then the subsequent device may search its local content item library database for a matching purchase identifier.

Other data fields in the universal identifier may also be parsed and checked for a local match. For example, some content items may be identified by a digital asset number that is stored in the universal identifier, or song title, artist, and album may comprise other data fields of the universal identifier. Thus, if the universal identifier does not include a local library identifier of the subsequent device, then the subsequent device can check a purchase identifier of the content item for a match in the local library, and failing that match, the subsequent device can check a digital asset management identifier, and failing that match, the subsequent device can check one or more item-type data fields until a match is found.

C. Finding the Content Item

Finding a match in the universal identifier to the content item comprises an affirmative outcome ("YES") at the FIG. 1 decision box 130. In response, the subsequent device can proceed with the activity involving the content item. In the example scenario discussed herein, the content item is a song, and in response to finding the content item in the local library, the subsequent device launches the music application and plays the local copy of the content item, as indicated by the box 140 in FIG. 1.

Failing any match to the content item identified in the universal identifier, a negative outcome at the decision box 130 of FIG. 1, the subsequent device can reasonably conclude that the data item does not exist in its local content item library database. If the content item is not present in the local content item library database of the subsequent device, then the subsequent device can obtain the content item, or can provide the preceding device with information concerning the lack of a local copy. In the case of no local copy at the subsequent device, either one of the devices can present the user with options for obtaining the content item. For example, because the content item is active on the preceding device, it is obtainable by the subsequent device from the preceding device, either directly from a library of the preceding device, or from download at the preceding device and subsequent transfer to the subsequent device. It is likely more efficient for the download to be performed by the subsequent device, for local storing, and the subsequent device may be configured to operate in that fashion. Alternatively, the user may be presented with the option to cancel the continuity request. These alternative responses to an indication of no local copy of the content item are indicated by the FIG. 1 box 150.

II. Universal Identification Between Devices

Figure 2:
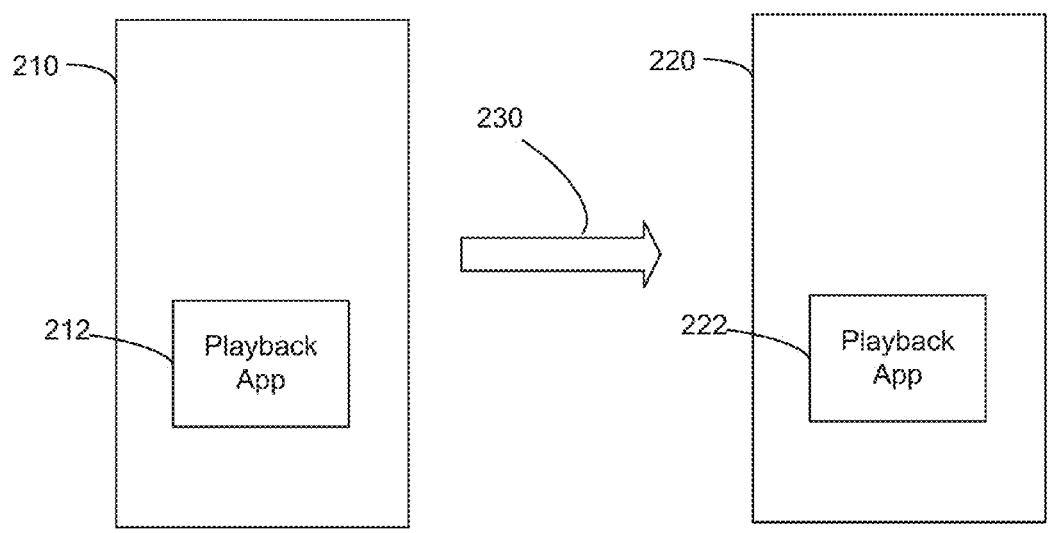
FIG. 2 is a representation of two devices that operate according to the description herein.

FIG. 2 is a representation of two devices that operate according to the description herein. FIG. 2 shows a preceding device 210, comprising a wireless electronic device on which an activity is proceeding, such as playback of a media content item via a playback application 212. FIG. 2 shows a subsequent device 220, which comprises a device on which the user wishes to continue with the activity uninterrupted. In the case of a playback activity, the continuity called for is that playback of the media content item will continue via a playback application 222, such that playback of the media content item is moved from the preceding device 210 to the subsequent device 220 with substantially no disruption or skip in the playback experience of the user.

Thus, if a content item comprising a song is being played on the preceding device 210, then upon activation of the continuity request at the subsequent device 220, playback of the song can be halted on the preceding device at a current location of the song and can be started on the subsequent device at substantially the same location of the song. The FIG. 2 arrow 230 indicates wireless communication between the two devices 210, 220 and indicates the transfer of content item playback from the preceding device 210 to the subsequent device 220 in response to selection of a continuity request at the subsequent device.

As noted above, when the continuity request icon is selected at the subsequent device 220, a continuity request message is sent to the preceding device. The identification of the preceding device from among one or more devices within wireless communication distance of the subsequent device is achieved through a system-level operational feature of the devices. That is, the last device with which the user interacted or engaged prior to the continuity request selection will identify itself as an "active" device to other device within communication distance. Thus, if multiple devices are operating, and if more than one of the multiple devices is involved with playback of a respective content item, it will nevertheless be the case that only one of the devices will identify itself as the last active device. For example, a device may report a clock time of last user activity, or interaction. It would then be a simple matter for the subsequent device to select the device with the most recent user activity as the last active device. Those skilled in the art will appreciate alternative techniques for determining a "last active device" from among multiple operating devices in wireless communication proximity to each other.

After the subsequent device has selected a last-active device as the preceding device, or after the user has selected an intended preceding device, the subsequent device will establish wireless communication with the preceding device through any one of conventional communications techniques, as will be known to those skilled in the art. The preceding device therefore receives the continuity request, and then will determine a universal identification that is contained in the continuity request.

Upon determining the last active device, the subsequent device can initiate communications with the last active device as comprising the preceding device, in the context of continuity request operations. As a result, the subsequent device can confirm communications with the preceding device such that the two respective devices understand their respective roles as preceding device and subsequent device. The preceding device, as part of its operation in response to the received continuity request, will also identify the active application that is being executed at the time of the continuity request. In the case of a playback application, such as the "iTunes" player, the preceding device will also provide a current playback time, to indicate the current playback position in the content item. The subsequent device can therefore initiate playback of the content item at substantially the same location, so that the user will perceive no change in playback position upon starting with the subsequent device. In this way, migration of the playback from one device to another is a seamless experience for the user. The devices 210, 220 may comprise a myriad of electronic devices capable of playback of content items, such as an "iPhone" device, an "iPad" device, an "iPod" device, or similar playback device.

III. Identifiers

As noted above, a seamless listening experience can be implemented with the universal identifier and operation of devices configured as described herein, in conjunction with utilization of the universal identifier. For example, the combination of separate identifiers of content items into the universal identifier contributes to quick identification of the content item for which continuity is desired. The separate identifiers may be generated in a variety of ways.

A. Universal Identifier Data Field of a Purchased Content Item

As noted above, a purchased content item Conventionally, a media content item that is purchased in an online transaction will be downloaded from a network connection to a media server. Each content item, such as a song or movie, is identified with a purchase identification ("purchase ID"). Additional identifiers of the service may also be used, such as a digital asset identifier or the like. A cloud storage service may identify the same content item with a unique identification. Each content item obtained from cloud storage therefore may be assigned a cloud storage ID. These identifiers may be included in the universal identifier described herein.

B. Local Identifier for Device Library

Each content item in the local content item library database of a device will be assigned a unique identification number for the content item when the content item is stored in the local library database of that device. This identification number is referred to as the local content item identification number. As noted above in the discussion under the heading "Identifying the Content Item", the local content item identification number (the "local content item ID") can comprise a device identifier prefix and a local library database identifier suffix. This local content item ID may be included as a data field in the universal identifier described herein, along with the other identifiers described herein, including the device-independent identifiers as well as respective local content item ID's for additional devices.

Using the local content item ID in the universal identifier can be easily achieved. For example, if the device is an "iPhone" device, then the device ID for each content item stored in the iPhone content item library database will be assigned by the iPhone device itself. In this way, each particular device that stores the content item will similarly assign its own corresponding device ID to the content item, and that device ID for the content item can be included in the universal identifier. Content items that may be obtained through means other than an online purchase, such as by conversion of a purchased item, will be assigned a device ID by the device, but will not be associated with an online purchase ID.

C. Combining Identifiers

The electronic devices according to the present invention utilize a universal identifier for each media content item. The universal identifier can include the information in all the known identification numbers of the media content item.

In one embodiment, the universal identifier may comprise, for example, a concatenation of the purchase ID, asset management ID, local device ID, and the like. The universal identifier may include one or more fields that identify a version control number, the number of ID fields to follow, and then followed by the ID values themselves. If the content item, such as a song, is purchased online via a mobile device, and if the mobile device is then synchronized to an iTunes library of another device, the universal identifier will be updated with the mobile device library identifier. That is, upon purchase, the content item will be assigned a digital asset management ID that is device-independent and will be assigned a purchase ID that is unique to the transaction.

As noted, upon being stored in the device local content item library database, the device will assign the content item with a device ID. Then, upon synchronizing the device with a database of another "home" device (e.g., an iTunes library of a desktop or laptop machine), the device will assign an identification number to the content item. All of these various fields and IDs can be combined or appended, as the content item is saved locally to provide the universal identifier. That is, each device that is configured to work with and parse the universal identifier will combine or append its data to the content item when it receives the item.

IV. Continuity Request User Interface

As noted above, when a user initiates a continuity request on an intended subsequent device, the continuity request is received at a preceding device. In particular, the continuity request may be transmitted from the subsequent device by any wireless communication technique. Such techniques may include protocols such as, for example, "Bluetooth" or WiFi, or near-field communications techniques such as "Zigbee", and the like. Upon the selection of the continuity request at the subsequent device, the subsequent device will identify the current active device, as described above, and will automatically look for an application on the preceding device that corresponds to the current activity of the preceding device. That is, the preceding device will be determined by the subsequent device to be a currently active device with an executing playback application. If there are multiple such devices, the subsequent device may automatically select the device with which the user last had an interaction. Alternatively, a menu of devices in the vicinity of the subsequent device may be presented for selection by the user, and the subsequent device may ask the user to select one of the devices as the preceding device, for purposes of continuity. Moreover, the subsequent device may present the user with a display that permits the user to cancel the continuity operation.

Figure 3:
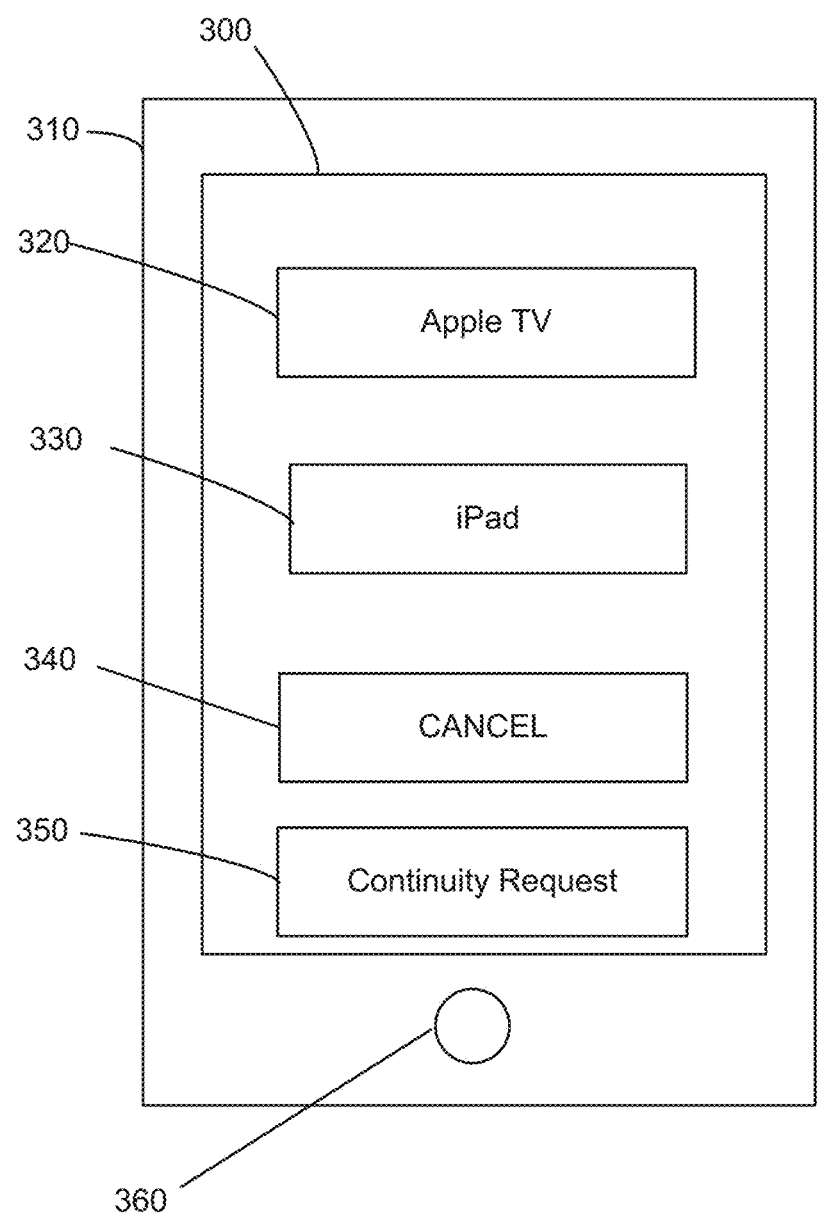
FIG. 3 is a representation of a display of a preceding device that indicates the device has detected nearby devices that are suitable for continuing the playback.

FIG. 3 is a representation of a touchscreen display 300 of an electronic device 310, such as one of the devices 210, 220, in which the user has selected a "continuity request" from a previous display screen or window of the electronic device 310. Thus, the device 310 comprises the subsequent device in a preceding-subsequent device pairing, for purposes of continuity. The display 300 indicates that the device 310 has detected nearby devices that are suitable for continuing the playback activity, and in the display 300 the electronic device 310 now solicits input from the user to select an intended preceding device from which continuity of playback is requested. The display 300 may include, for example, options for operation, such as listing the nearby devices that are identified in FIG. 3 as an "Apple TV" 320 and an "iPad" 330, one of which will be selected for implementing, or a cancel operation 340 may be selected. The continuity request icon 350 shows the icon selected by the user to request the continuity processing, and may be selected to re-initiate operation (and detection of nearby devices), if desired. The home button 360 represents a physical "home" button that may be pressed to return to a top-most screen display level. Selection of an item 320, 330, 340, 350 may be implemented by the user tapping the selected item on the touchscreen display 300. It should be understood that other devices may be detected and listed in the list of the display.

V. Universal Identifier Content

The universal identifier retrieved from the continuity request identifies the content item that is currently playing on the preceding device and provides multiple data fields, any one of which might be sufficient to identify the content item. For example, in the case of a music content item, the universal identifier comprises at least (a) an assigned digital asset management identifier that identifies the content item and that is device-independent, (b) a local identifier of the content item that is uniquely assigned to the content item and corresponds to a location of the content item in a content database of the preceding device, and (c) metadata relating to the content item assigned by the preceding device such that the metadata specifies a playback locater of the content item.

FIG. 4A and FIG. 4B depict data fields of an example universal identifier 400. FIG. 4A and FIG. 4B are related as depictions of data fields in the universal identifier for an initial state in FIG. 4A and a subsequent state FIG. 4B, wherein FIG. 4B shows the initial state universal identifier after additional local library identifier information has been added. The universal identifier includes a header field to identify the information to follow as comprising fields of a universal identifier. FIG. 4A and FIG. 4B do not show all the data fields in the universal identifier, for simplicity of illustration, but are shown with sufficient details for purposes of explanation.

The universal identifier may also include an identification of content item metadata to specify aspects of the content item. For example, the universal identifier may include fields corresponding to song title, genre, artist, playlist, album, release date, user rating, playback frequency, and the like.

The playback locater may comprise, for example, elapsed time of playback for the content item on the preceding device. The subsequent device may then begin playback of the content item at the same elapsed time, or at a time determined to provide subjectively uninterrupted playback of the content item on the subsequent device.

The universal identifier can be used by the subsequent device to determine if the content item that is the subject of the continuity request is present on the subsequent device. The subsequent device can then take appropriate action to facilitate uninterrupted playback of the content item, or can cancel the continuity request.

VI. Determining Content Item Availability

To determine if the content item exists in the subsequent device content item library database, as indicated by the FIG. 1 decision box 130, the subsequent device examines the universal identifier. The subsequent device parses the universal identifier contained in the continuity request, and if a subsequent device ID for the content item is contained in the universal identifier, the subsequent device confirms that the content item is stored in its own local content item library database.

During a synchronization operation, if the content item is being added to the content item library database of the subsequent device, the local device ID will be assigned to the content item when it is stored in the library database of the subsequent device. The universal identifier for the content item, when produced by the subsequent device thereafter, will include the subsequent device ID. If the content item does not exist in the subsequent device library database, the subsequent device may offer multiple options to the user at the preceding device.

The subsequent device can determine from the universal identifier if the content item is stored at the preceding device, and can request a sync operation to obtain it. Such a sync operation may be automatically performed, or the subsequent device can send a message back to the preceding device, which can then offer the choice to the user to either sync or cancel the continuity request.

Rather than transfer the content item in a sync operation, the user may wish to obtain the content item missing from the subsequent device by online purchase or transfer from a network source. These options may be presented to the user at the preceding device, according to the desired configuration of the preceding device.

VII. Path Tracking

Different devices have different screens of information to show songs, playlists, albums, artists, genres, and the like, in accordance with the respective different user interfaces that can be expected for each device and screen combination. In permitting a user to continue the user experience by listening to a content item from a preceding device to a subsequent device, it is desirable to accommodate devices of different types and formats, with correspondingly different display screens.

Part of the user experience during a listening activity is to consider the path of library subsets through which the user traversed or navigated to select the content item and initiate playback. This path information is also useful for determining sets of which the content item is a member. For example, when listening to a song, the user may have initiated playback by selecting the song itself, but alternatively the user might have selected a particular genre, and then a particular artist, and then a particular album, before arriving at the song currently being played. The latter selection path for the song involves selecting genre, artist, album, and then song. The menu screens or displays through which a user may have navigated may comprise different menu screens for different devices.

Therefore, to provide the desired user experience and permit inspection of the selection path, a device in accordance with embodiments can track the selection path by which the preceding device came to be playing the content item, and moreover, the information comprising the selection path is preserved through the playback continuation from a preceding device to a subsequent device, and accompanies the information sent from the preceding device to the subsequent device in response to the continuity request. That is, for the currently playing content item that was the subject of a continuity request, the preceding device generates the selection path track information to define the selection path, or sequence, by which the preceding device came to be playing the content item. That selection path track information can be sent from the preceding device to the subsequent device after the user initiates the continuity request, to facilitate content item identification at the subsequent device.

Those skilled in the art will appreciate that, for a content item being actively played on a preceding device, the selection path comprising the menu selections that the user executed on the preceding device to begin playback of the content item will correspond to an "active tab" of a display on the preceding device. That is, the operating system of the preceding device will know the selection path to playback of the currently playing content item. Therefore, the preceding device can obtain the path track information from the preceding device operating system, and can provide it to the subsequent device, upon issuance of a continuity request. Thus, this feature of present embodiments of the invention can be conveniently provided via information that is available from the device operating system.

As described above, the path tracking feature is useful for purposes of considering navigation, so that the same content item will proceed from the preceding device to the subsequent device, and also so the path to the same content item will be available on the subsequent device. The path tracking feature is also applicable to any application that is the subject of a continuity request from the preceding device to the subsequent device, so the corresponding track item will properly appear in the corresponding application of the subsequent device and so the content item selection path will be available on the subsequent device will be to get the same menu, and not just for a media content. For example, at the subsequent device, the user may select the "back" button on the application display to reverse the steps taken by the user on the preceding device to reach the content item. In this way, the user at the subsequent device may see the preceding selection path. It should be noted, however, that the precise selection path steps may differ as between the selection path on the preceding device and the corresponding selection path on the subsequent device, due to their possibly different user interfaces.

VIII. Sequence of Continuity Request Operations

Figure 5:
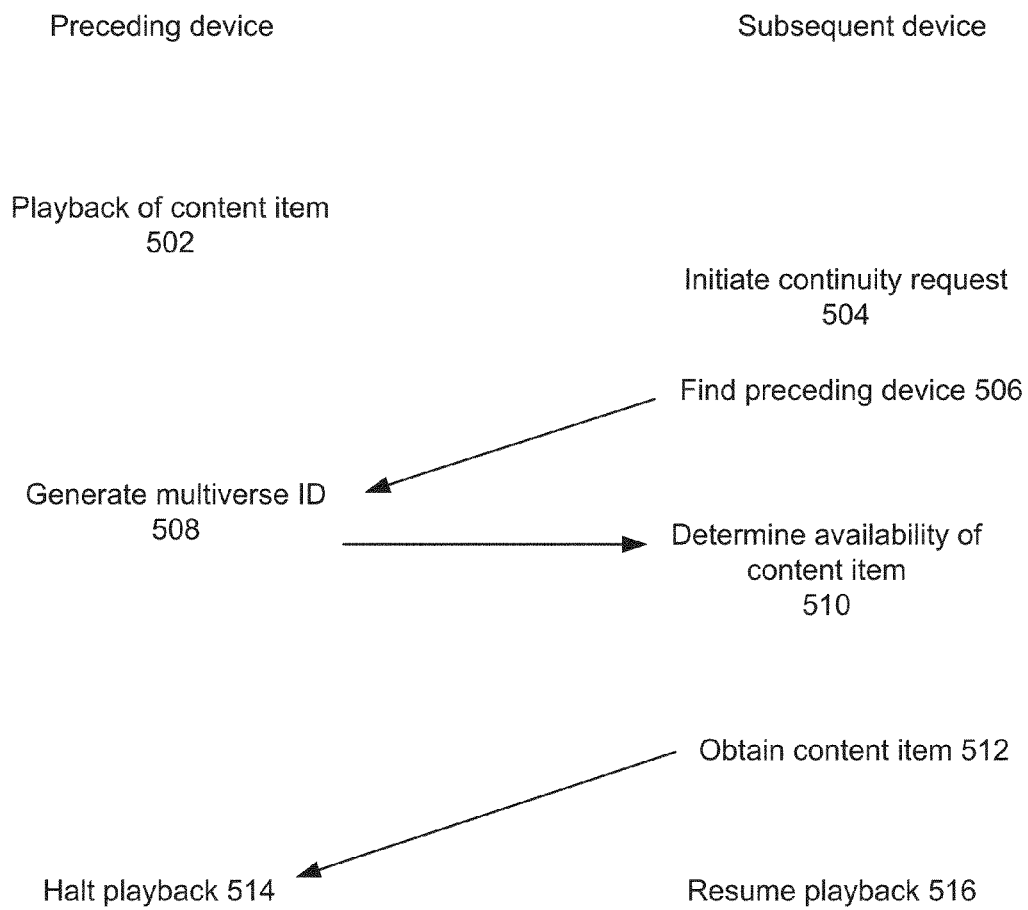
FIG. 5 is a transaction diagram that illustrates the sequence of operations to implement the playback continuity in accordance with the present invention.

FIG. 5 is a transaction diagram that illustrates the sequence of operations to implement the playback continuity in accordance with embodiments of the present invention. Operations performed by the preceding device are illustrated in the column to the left of FIG. 5, under the heading "Preceding device", and operations performed by the subsequent device are illustrated in the column to the right of FIG. 5, under the heading "Subsequent device". Time is indicated along the vertical axis, with initial time at the top of the FIG. 5 drawing and time progressing in the page downward direction.

In the FIG. 5 embodiment of operation, the playback of a content item is proceeding 502 on a preceding device. The continuity operation is initiated by a user selecting 504 the continuity request operation at the subsequent device. In response, the subsequent device operation 504 seeks to discover nearby wireless devices that are candidates from which transfer of their playback stream may be assumed. Such discovery may take place over wireless communication protocols in accordance with conventional practice, as noted above. Upon discovering and identifying a last-active wireless device (the preceding device), the subsequent device sends a continuity request 506 to the preceding device. At the preceding device, the universal identifier is generated and is sent 508 to the subsequent device. Upon receiving the universal identifier, the subsequent device determines 510 if the content item currently playing on the preceding device is a content item stored in the subsequent device.

The subsequent device then obtains 512 the content item, either from confirming that the content item is locally available, or by obtaining the content item from the preceding device, or by obtaining the content item from a network source, such as a music store. When the content item is obtained, the subsequent device also reports to the preceding device that the content item has been obtained or has been located locally. The preceding device then halts playback 514 and the subsequent device resumes playback 516 at approximately the location in the content item that was last played by the preceding device.

IX. Mobile Device

Figure 6:
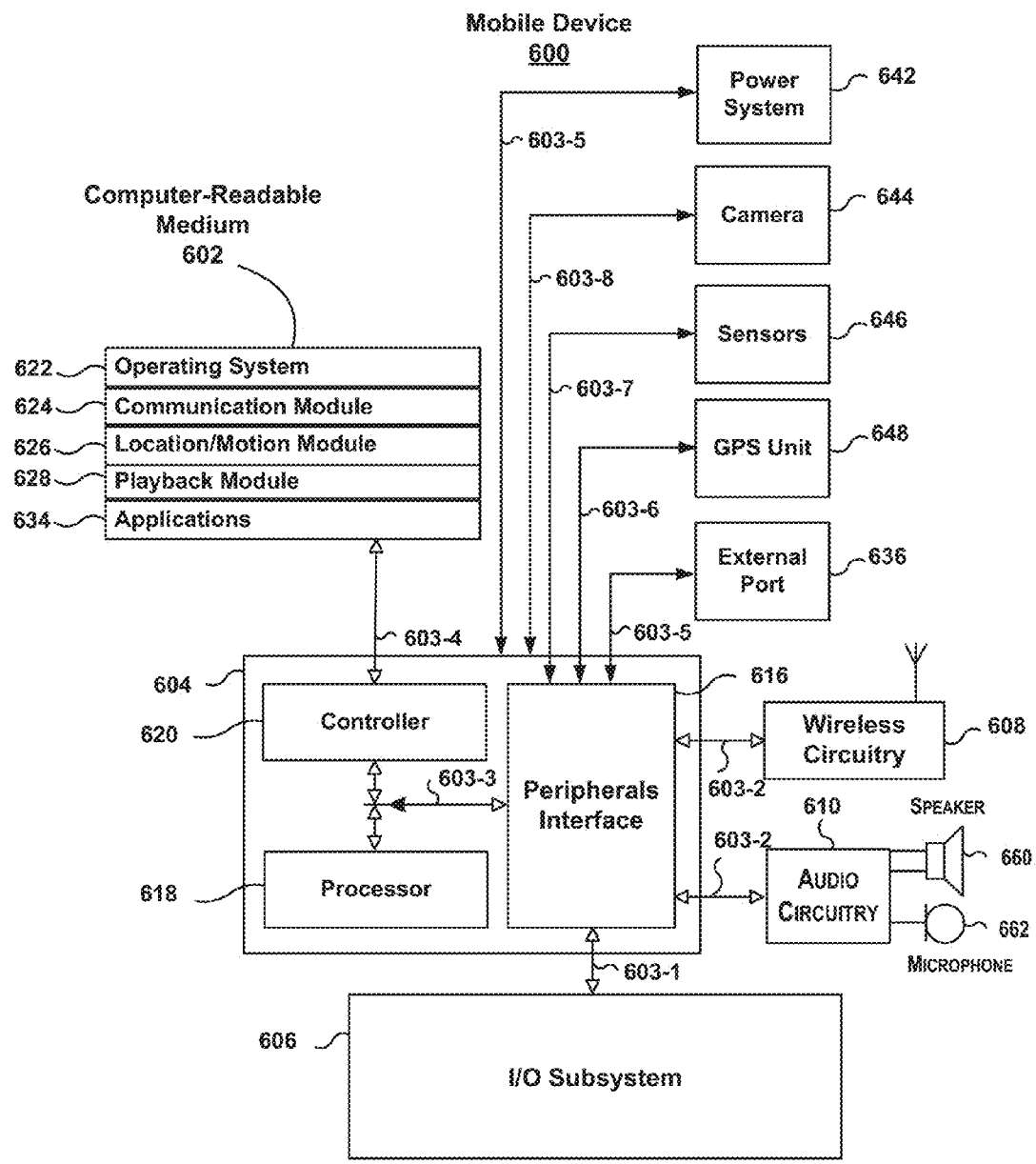
FIG. 6 is a block diagram of a portable electronic device or mobile device 600 according to an embodiment of the invention.

FIG. 6 is a block diagram of a portable electronic device or mobile device 600 according to an embodiment of the invention. For example, the electronic devices 210, 220 described above may be configured according to the mobile device 600. The mobile device 600 generally includes a computer-readable medium 602, a processing system 604, an Input/Output (I/O) subsystem 606, wireless circuitry 608, and audio circuitry 610 including a speaker 560 and a microphone 662. These components may be coupled by one or more communication buses or signal lines 603. The device 600 can be any portable electronic device, including a wearable computer device, a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. As examples, a wearable device can comprise a wrist worn device, a device that is clipped or pinned to the user's clothing, a device with a lanyard or chain that is wearable around the user's neck, a headband device, eyeglasses, or any other device that can be secured to the user's person or clothing.

It should be apparent that the architecture shown in FIG. 6 is only one example of an architecture for the mobile device 600, and that device 600 can have more or fewer components than shown, or a different configuration of components. The various components shown in FIG. 6 can be implemented in hardware, software, or a combination of both hardware and software, including one or more signal processing and/or application specific integrated circuits.

Wireless circuitry 608 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some embodiments, the wireless circuitry 608 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

The wireless circuitry 608 is coupled to a processing system 604 via a peripherals interface 616. The interface 616 can include conventional components for establishing and maintaining communication between peripherals and the processing system 604. Voice and data information received by the wireless circuitry 608 (e.g., in speech recognition or voice command applications) is sent to one or more processors 618 via the peripherals interface 616. One or more processors 618 are configurable to process various data formats for one or more application programs 634 stored on the medium 602.

The peripherals interface 616 couples the input and output peripherals of the device to a processor 618 and the computer-readable medium 602. One or more processors 618 communicate with the computer-readable medium 602 via a controller 620. The computer-readable medium 602 can be any device or medium that can store code and/or data for use by one or more processors 618. The medium 602 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, the peripherals interface 616, one or more processors 618, and the memory controller 620 can be implemented on a single chip, such as processing system 604. In some other embodiments, they can be implemented on separate chips.

The mobile device 600 also includes a power system 642 for powering the various hardware components. The power system 642 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, the mobile device 600 includes a camera 644. In some embodiments, the mobile device 600 includes sensors 646. The sensors can include accelerometers, compass, gyrometer, pressure sensors, audio sensors, light sensors, barometers, and the like. The sensors 646 can be used to sense location aspects, such as auditory or light signatures of a location.

In some embodiments, the mobile device 600 can include a GPS receiver, sometimes referred to as a GPS unit 648. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 618 run various software components stored in the medium 602 to perform various functions for the device 600. In some embodiments, the software components include an operating system 622, a communication module (or set of instructions) 624, a location module (or set of instructions) 626, a playback app 628, and other applications (or sets of instructions) 634, such as a navigation app.

The operating system 622 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

The communication module 624 facilitates communication with other devices over one or more external ports 636 or via wireless circuitry 608 and includes various software components for handling data received from the wireless circuitry 608 and/or external port 636. The external port 636 (e.g., USB, FireWire, Lightning connector, 30-pin connector, etc.) is adapted for coupling directly to other devices or indirectly over a network (e.g., the Internet, wireless LAN, etc.).

The one or more applications 634 on the mobile device can include any applications installed on the device 600, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), and the like. The one or more applications 634 can also include a specific app for requesting continuity, controlling playback of content items, updating the content item database, or any other suitable application.

There may be other modules or sets of instructions (not shown), such as a graphics module, a time module, and the like. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 606 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, the I/O subsystem 606 can include a display and user input devices such as a keyboard, mouse, and/or trackpad. In some embodiments, the I/O subsystem 606 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the medium 602) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 600 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method of communicating between a preceding device and a subsequent device, the method comprising:
   sending a continuity request from the subsequent device to the preceding device, the continuity request indicating an intent to continue an active operation of a content item from the preceding device to the subsequent device, wherein the active operation relates to a current activity of the preceding device that is being performed on the content item;
   receiving a universal identifier at the subsequent device, wherein the universal identifier is generated by the preceding device and identifies the content item that is currently active on the preceding device, wherein the universal identifier is a combination of information comprising:
      a device-independent identifier that identifies the content item and a local identifier of the content item that is uniquely assigned to the content item by the preceding device and that corresponds to a location of the content item in a first local content item library database of the preceding device, and
      metadata that specifies an application process location of the content item for the current activity;
   determining, at the subsequent device, whether the content item exists in a second local content item library database of the subsequent device based on the universal identifier; and
   playing the content item from the second local content item library database of the subsequent device, if the content item exists in the second local content item library database and if the current activity relates to an active application on the subsequent device.

2. The method of claim 1, wherein the continuity request is initiated at the subsequent device by a user input at a user interface of the subsequent device, and wherein the continuity request is sent from the subsequent device to the preceding device in response to the user input.

3. The method of claim 1, wherein the universal identifier further comprises a corresponding local identifier for each of one or more corresponding devices other than the preceding device, each corresponding local identifier for a location of the content item in a respective local content item library database of the corresponding other device.

4. The method of claim 3, wherein the one or more corresponding devices include a device other than the subsequent device.

5. The method of claim 1, wherein playing the content item from the subsequent device comprises playing the content item at substantially a same playback location of the content item in the subsequent device as in the preceding device.

6. The method of claim 1, wherein receiving the universal identifier further includes receiving selection path track information that defines a selection path by which the content item specified in the universal identifier was selected by an active application on the preceding device.

7. The method of claim 6, wherein the subsequent device displays information from the selection path track information that corresponds to a path track for selection of the content item on the preceding device.

8. The method of claim 1, wherein either the subsequent device or the preceding device comprises a wearable computer device.

9. The method of claim 1, wherein determining whether the content item exists in the subsequent device comprises the subsequent device parsing the universal identifier to identify a local identifier field in the universal identifier that indicates a location of the content item in the second content item library database of the subsequent device or, in response to not identifying a local identifier field, identifying a purchase identifier field in the universal identifier.

10. The method of claim 1, further comprising:
    determining, by the subsequent device, which of a plurality of other devices that are within wireless communication of the subsequent device corresponds to the preceding device.

11. The method of claim 1, wherein:
    the local identifier of the content item is a first local identifier of the content item; and
    the method further comprises adding a second local identifier to the universal identifier when it is determined that the content item does not exist in the second local content item library database, the second local identifier being uniquely assigned to the content item by the subsequent device and corresponding to a location of the content item in the second local content item library database.

12. An electronic device for communicating with a preceding device, at which a current activity is being performed on a content item by an application, wherein the electronic device is a subsequent device at which the current activity will be continued, the electronic device comprising:
    one or more processors; and
    a computer-readable storage medium containing instructions that, when executed by the one or more processors, cause the one or more processors to:
       send a continuity request from the subsequent device to the preceding device, the continuity request indicating an intent to continue an active operation of the content item from the preceding device to the subsequent device;
       receive a universal identifier at the subsequent device, wherein the universal identifier is generated by the preceding device and identifies the content item that is currently active on the preceding device, and wherein the universal identifier is a combination of information comprising:
          a device-independent identifier that identifies the content item and a local identifier of the content item that is uniquely assigned to the content item by the preceding device and that corresponds to a location of the content item in a first local content item library database of the preceding device, and
          metadata that specifies an application process location of the content item for the current activity;
       determine, at the subsequent device, whether the content item exists in a second local content item library database of the subsequent device based on the universal identifier; and
       play the content item from the second local content item library database of the subsequent device, if the content item exists in the second local content item library database and if the current activity relates to an active application on the subsequent device.

13. The electronic device of claim 12, wherein the continuity request is initiated at the subsequent device by a user input at a user interface of the subsequent device, and wherein the continuity request is sent from the subsequent device to the preceding device in response to the user input.

14. The electronic device of claim 12, wherein the universal identifier further comprises a corresponding local identifier for each of one or more corresponding devices other than the preceding device, each corresponding local identifier for a location of the content item in a respective local content item library database of the corresponding other device.

15. The electronic device of claim 12, wherein playing the content item from the subsequent device comprises playing the content item at substantially a same playback location of the content item in the subsequent device as in the preceding device.

16. The electronic device of claim 12, wherein receiving the universal identifier at the subsequent device further includes receiving selection path track information that defines a selection path by which the content item specified in the universal identifier was selected by an active application on the preceding device.

17. The electronic device of claim 16, wherein the subsequent device displays information from the selection path track information that corresponds to a path track for selection of the content item on the preceding device.

18. The electronic device of claim 12, wherein either the subsequent device or the preceding device comprises a wearable computer device.

19. The electronic device of claim 12, wherein determining whether the content item exists in the subsequent device comprises the subsequent device parsing the universal identifier to identify a local identifier field in the universal identifier that indicates a location of the content item in the second content item library database of the subsequent device or, in response to not identifying a local identifier field, identifying a purchase identifier field in the universal identifier.

20. An electronic device for communicating with a subsequent device, wherein the electronic device is a preceding device at which a current activity is being performed on a content item, the electronic device comprising:
   one or more processors; and
   a computer-readable storage medium containing instructions that, when executed by the one or more processors, cause the one or more processors to:
      receive a continuity request from the subsequent device at the preceding device, the continuity request indicating an intent to continue an active operation of the content item from the preceding device to the subsequent device; and
      send a universal identifier from the preceding device to the subsequent device, wherein the universal identifier is generated by the preceding device and identifies the content item that is currently active on the preceding device, and wherein the universal identifier is a combination of information comprising:
         a device-independent identifier that identifies the content item and a local identifier of the content item that is uniquely assigned to the content item by the preceding device and that corresponds to a location of the content item in a first local content item library database of the preceding device, and
         metadata that specifies an application process location of the content item,
      wherein the universal identifier is useable by the subsequent device to:
         identify the content item at a second location of the content item in a second local content library database of the subsequent device; and
         play the content item from the second local content library database of the subsequent device if the current activity relates to an active application on the subsequent device.

21. The electronic device of claim 20, wherein the universal identifier further comprises a corresponding local identifier for each of one or more corresponding devices other than the preceding device, each corresponding local identifier for a location of the content item in a respective local content item library database of the corresponding other device.

22. The electronic device of claim 20, wherein the universal identifier further includes selection path track information that defines a selection path by which the content item specified in the universal identifier was selected by an active application on the preceding device.

23. The electronic device of claim 20, wherein either the subsequent device or the preceding device comprises a wearable computer device.

* * * * *